United States Patent
Hase

(10) Patent No.: US 12,524,185 B2
(45) Date of Patent: Jan. 13, 2026

(54) TEST ITEM MANAGEMENT SYSTEM DISPLAY DEVICE, MANAGEMENT SYSTEM, CONTROL METHOD, AND STORAGE MEDIUM

(71) Applicant: SHIMADZU CORPORATION, Kyoto (JP)

(72) Inventor: Yugo Hase, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 486 days.

(21) Appl. No.: 18/011,005

(22) PCT Filed: Apr. 7, 2021

(86) PCT No.: PCT/JP2021/014769
§ 371 (c)(1),
(2) Date: May 16, 2023

(87) PCT Pub. No.: WO2021/261050
PCT Pub. Date: Dec. 30, 2021

(65) Prior Publication Data
US 2024/0264785 A1    Aug. 8, 2024

(30) Foreign Application Priority Data
Jun. 25, 2020 (JP) ................ 2020-109409

(51) Int. Cl.
*G06F 3/04842* (2022.01)
*G06F 3/14* (2006.01)

(52) U.S. Cl.
CPC ............ *G06F 3/14* (2013.01); *G06F 3/04842* (2013.01)

(58) Field of Classification Search
CPC ...... G06F 3/14; G06F 3/04842; G06F 3/0484; G01N 35/00; G01N 35/02
See application file for complete search history.

(56) References Cited

U.S. PATENT DOCUMENTS 5,008,081 A * 4/1991 Blau ................ G01N 33/442
422/63
8,875,030 B1 * 10/2014 Loverin .............. G06F 3/0481
715/752

(Continued)

FOREIGN PATENT DOCUMENTS

JP    2000-76303 A    3/2000
JP    2001-325296 A    11/2001

(Continued)

OTHER PUBLICATIONS

International Search Report for corresponding Application No. PCT/JP2021/014769, mailed Jun. 8, 2021.

(Continued)

*Primary Examiner* — David J Bolduc
(74) *Attorney, Agent, or Firm* — Renner, Otto, Boisselle & Sklar, LLP

(57) ABSTRACT

Provided is a display device used in a management system that manages a test item set for each of a plurality of samples to be tested, the display device including: a display unit; a controller that controls the display unit, wherein the controller displays an image corresponding to each of the plurality of samples on the display unit in a display manner according to a setting content of the test item for the sample.

14 Claims, 11 Drawing Sheets

(56) References Cited

U.S. PATENT DOCUMENTS

| | | | |
|---|---|---|---|
| 2002/0082870 A1* | 6/2002 | Penny | G16H 40/67 |
| | | | 705/3 |
| 2011/0259129 A1 | 10/2011 | Murata et al. | |
| 2012/0010899 A1* | 1/2012 | Minato | G16H 10/40 |
| | | | 705/2 |
| 2014/0109527 A1* | 4/2014 | Burri | G01N 35/00 |
| | | | 422/65 |
| 2014/0145082 A1 | 5/2014 | Fukuma | |
| 2015/0360239 A1* | 12/2015 | Yano | G01N 35/02 |
| | | | 494/10 |
| 2017/0176479 A1* | 6/2017 | Lüdicke | G06F 3/04847 |
| 2020/0230607 A1* | 7/2020 | Kobari | H10N 10/13 |
| 2024/0069047 A1* | 2/2024 | Matsushita | G06F 9/451 |

FOREIGN PATENT DOCUMENTS

| | | |
|---|---|---|
| JP | 2010-151707 A | 7/2010 |
| WO | 2013/002291 A1 | 1/2013 |

OTHER PUBLICATIONS

Written Opinion for corresponding Application No. PCT/JP2021/014769, mailed Jun. 8, 2021 (English Machine Translation).
Glutathione formulatiion for eye drops 2% (Tathion®) 2% for Ophthalmic), Choseido Pharmaceutical Co., Ltd.), non-official translation (Pharmaceutical Interview Form.), p. 13 (Jun. 2019).
Office Action for corresponding Japanese Application No. 2022-532326 dated Jan. 16, 2024 and its English translation.

\* cited by examiner

FIG.4

| STORAGE CONDITION, STORAGE PERIOD | 10°C 30%,1d |
|---|---|
| TEST ITEM | |

FIG.5

| STORAGE CONDITION, STORAGE PERIOD | 10°C 30%,1d |
|---|---|
| TEST ITEM | ·TEST A<br>·TEST B<br>·TEST C<br>·TEST D<br>·TEST E |

FIG.8

| STORAGE CONDITION, STORAGE PERIOD OF SAMPLE | SET TEST ITEM |
|---|---|
| 10°C 30%, 1d | TEST A<br>TEST B<br>TEST C<br>TEST D<br>TEST E |
| 20°C 30%, 1d | TEST A<br>TEST B<br>TEST C<br>TEST E |
| 30°C 30%, 1d | TEST A |
| ⋮ | ⋮ |

FIG.9

| COLOR PARAMETER | COLOR OF CELL |
|---|---|
| 1 | BLUE |
| 2 | RED |
| 3 | GREEN |
| ⋮ | ⋮ |

TEST ITEM MANAGEMENT SYSTEM DISPLAY DEVICE, MANAGEMENT SYSTEM, CONTROL METHOD, AND STORAGE MEDIUM

TECHNICAL FIELD

The present invention relates to a test item management system display device, a management system, a control method, and a program.

BACKGROUND ART

Conventionally, various testing devices for testing samples such as chemicals have been proposed. For example, a testing device of WO 2013/002291 A (PTL 1) outputs light to a tablet that is an example of a sample, and inspects components and the like of the tablet on the basis of reflected light from the tablet. In addition, a user may test the sample by visually observing a color or the like of a reactant after making a reagent react with the sample without using the testing device.

CITATION LIST

Patent Literature

PTL 1: WO 2013/002291 A

SUMMARY OF INVENTION

Technical Problem

Since there are various test items of the test for the sample, the user needs to manage the test items. Therefore, the user needs to set, in a management device, the test items of the test to be performed for each of the plurality of samples. In addition, the user may confirm the set test items after setting the test items. As a method for the user to confirm the test items set for each of the samples, a configuration is conceivable in which the management device displays an image corresponding to the sample and displays the test items set for the sample together with the image. However, in this configuration, when the number of samples and the number of test items set for each of the samples are large, the number of test items to be displayed increases. Therefore, there may be a problem that it is difficult for the user to confirm the test items set in the samples.

In order to solve such a problem, a configuration is conceivable in which a content of the test items set for the sample is displayed in response to selection of the image corresponding to the sample by the user. However, in this configuration, when no image is selected by the user, the test items are not displayed. Therefore, when the user confirms the content of the test items for the sample, the user needs to repeatedly select the image corresponding to the sample. Therefore, there may be a problem that it is difficult for the user to confirm the setting content of the test items for the sample.

The present invention has been achieved to solve the above problems, and an object of the present invention is to provide a technique that facilitates confirmation of a setting content of a test item for a sample by a user.

Solution to Problem

A display device according to an aspect of the present disclosure is used in a management system that manages a test item for each of a plurality of samples. The display device includes a display unit and a control unit that controls the display unit. The control unit displays an image corresponding to each of the plurality of samples on the display unit in a display manner according to a setting content of the test item for the sample.

Advantageous Effects of Invention

According to the technique of the present disclosure, since the image corresponding to each of the plurality of samples is displayed in the display manner according to the setting content of the test item for the sample, it is possible to provide a technique that facilitates confirmation of the setting content of the test item for the sample by the user.

BRIEF DESCRIPTION OF DRAWINGS

FIG. 4 is one example of a screen displayed by the display device.

FIG. 5 is one example of a screen displayed by the display device.

FIG. 7 is a functional block diagram of the display device and the like.

FIG. 8 illustrates one example of test items stored in a storage unit.

FIG. 9 is a diagram illustrating one example of a color DB.

DESCRIPTION OF EMBODIMENTS

Figure 1:
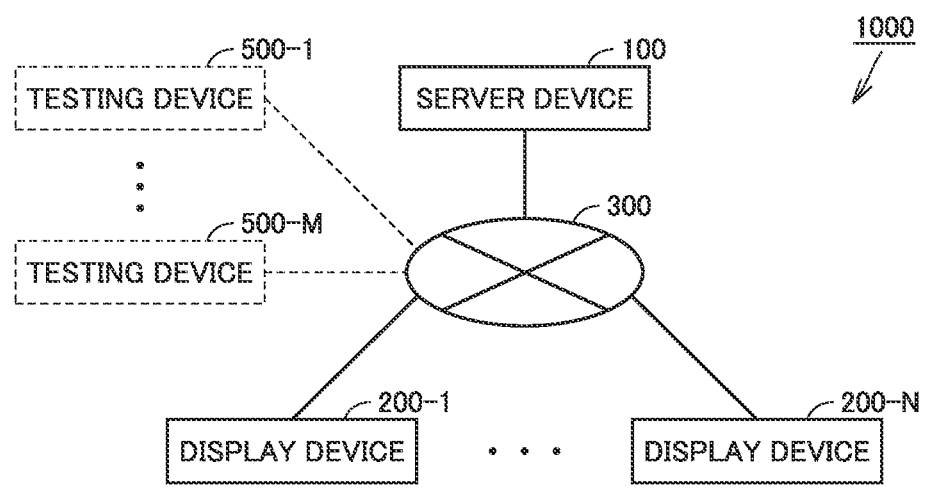
FIG. 1 is a diagram illustrating a configuration example of a management system.

Hereinafter, referring to the drawings, embodiments of the present disclosure will be described in detail. Note that in figures, the same or corresponding units are denoted by the same reference signs, and description thereof will not be repeated.

[Test and Management System]

FIG. 1 is a diagram illustrating a configuration example of a management system 1000 according to the present embodiment. Referring to FIG. 1, management system 1000 includes a server device 100, one or more display devices 200-1, . . . , and 200-N, and a network 300. N is an integer greater than or equal to one. Management system 1000 may include one or more testing devices 500-1, . . . , 500-M as necessary. M is an integer greater than or equal to one. Hereinafter, the one or more display devices are also collectively referred to as a "display device 200". In addition, the one or more testing devices are also collectively referred to as a "testing device 500".

A user performs a test on the sample. The sample is, for example, a pharmaceutical product, more particularly a "tablet". In general, the user performs the test on a plurality of test items for each of a plurality of samples. The user may test each of the samples using the testing device. In addition, the user may test each of the samples by visually observing a color or the like of a reactant after making a reagent react with the sample without using the testing device. The user causes management system 1000 to manage the test items. Management system 1000 manages, for each of the samples, the test items set for each of the plurality of samples used in the testing device represented by an analysis device. The user can plan future tests for the samples by using management system 1000.

Server device 100 and display device 200 are connected to network 300, and are configured to be able to communicate with each other. Further, as necessary, testing device 500 may be configured to be able to communicate with server device 100 and display device 200.

Server device 100 manages (stores) information such as the test items transmitted from one or more display devices 200. An information processing device (not particularly illustrated) receives, on the basis of a user operation, at least part of information such as the test items managed by server device 100. The information processing device displays the received information. As a result, the user can grasp the test items of the test to be performed by the user.

Testing device 500 may be any device as long as it can perform the test on the samples. Testing device 500 includes, for example, a liquid chromatograph device, a gas chromatograph device, a liquid chromatograph mass spectrometer, a gas chromatograph mass spectrometer, a scanning electron microscope, a transmission electron microscope, an energy dispersive X-ray fluorescence spectrometer, a wavelength dispersive X-ray fluorescence spectrometer, a Fourier transform infrared spectrophotometer, and the like. Testing device 500 may further include a photodiode array detector, a liquid chromatography tandem mass spectrometer, a gas chromatography tandem mass spectrometer, a liquid chromatograph mass spectrometer, a near infrared spectrometer, a tensile tester, a compression tester, and the like.

Display device 200 is a device that displays various images. Display device 200 is, for example, any of a personal computer (PC), a smartphone, a tablet, and the like. When display device 200 is a PC, an input device 350 (see FIG. 2) is connected to display device 200. Input device 350 includes a mouse, a keyboard, and the like. In addition, in a case where display device 200 is a smartphone or a tablet, display device 200 has a touch panel in which a display unit and input device 350 are integrated. The user can select an image to be displayed by display device 200, using input device 350.

Display device 200 accepts, from the user, setting of the test items and the like of the test to be performed for the samples in the future. Display device 200 displays the test items and the like of the test set by the user. One or more display devices 200 transmit the information such as the test items set by the user to server device 100 via network 300.

[Hardware Configuration of Display Device 200]

Figure 2:
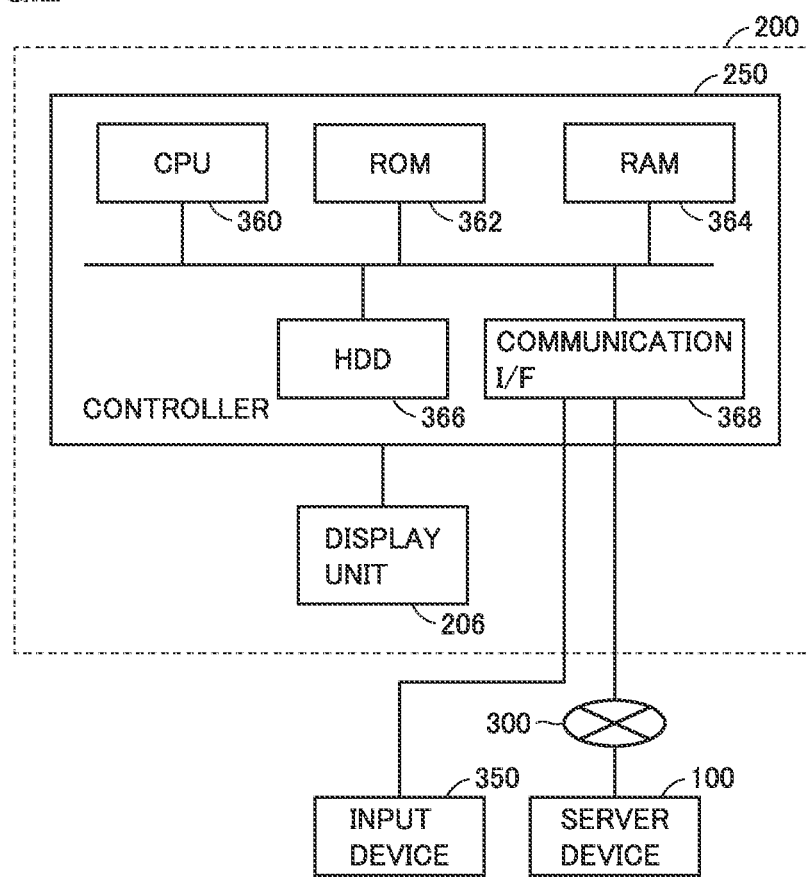
FIG. 2 is a diagram illustrating one example of a hardware configuration of a display device.

FIG. 2 is a diagram illustrating one example of a hardware configuration of display device 200. Display device 200 has a controller 250 and a display unit 206. Controller 250 corresponds to a "control unit" of the present disclosure.

Controller 250 has, as main components, a central processing unit (CPU) 360, a storage unit that stores programs and data, and a communication interface (I/F) 368. The components are connected to each other by a data bus.

The storage unit includes a read only memory (ROM) 362, a random access memory (RAM) 364, and a hard disk drive (HDD) 366. ROM 362 stores a program executed by CPU 360. RAM 364 can temporarily store data generated by execution of the program in CPU 360 and data input via communication I/F 368. RAM 364 can function as a temporary data memory used as a work area. HDD 366 is a nonvolatile storage device. In addition, instead of HDD 366, a semiconductor storage device such as a flash memory may be adopted.

In addition, the program stored in ROM 362 may be stored in a recording medium and distributed as a program product. Alternatively, the program may be provided as a program product that can be downloaded by an information provider through the so-called Internet or the like. Display device 200 reads the program provided by a recording medium, the Internet, or the like. Display device 200 stores the read program in a predetermined storage area (e.g., ROM 362). CPU 360 executes the above-described display processing by executing the stored program.

The recording medium is not limited to a digital versatile disk read only memory (DVD-ROM), a compact disc read only memory (CD-ROM), a flexible disk (FD), or a hard disk, and may be a medium that fixedly carries the program, such as a magnetic tape, a cassette tape, an optical disk (magnetic optical disc (MO)/mini disc (MD)/digital versatile disc (DVD)), an optical card, a mask ROM, an electronically programmable read only memory (EPROM), an electronically erasable programmable read only memory (EEPROM), or a semiconductor memory such as a flash ROM. In addition, the recording medium is a non-transitory medium on which a computer can read the program and the like.

[Screen Displayed by Display Device 200]

Figure 3:
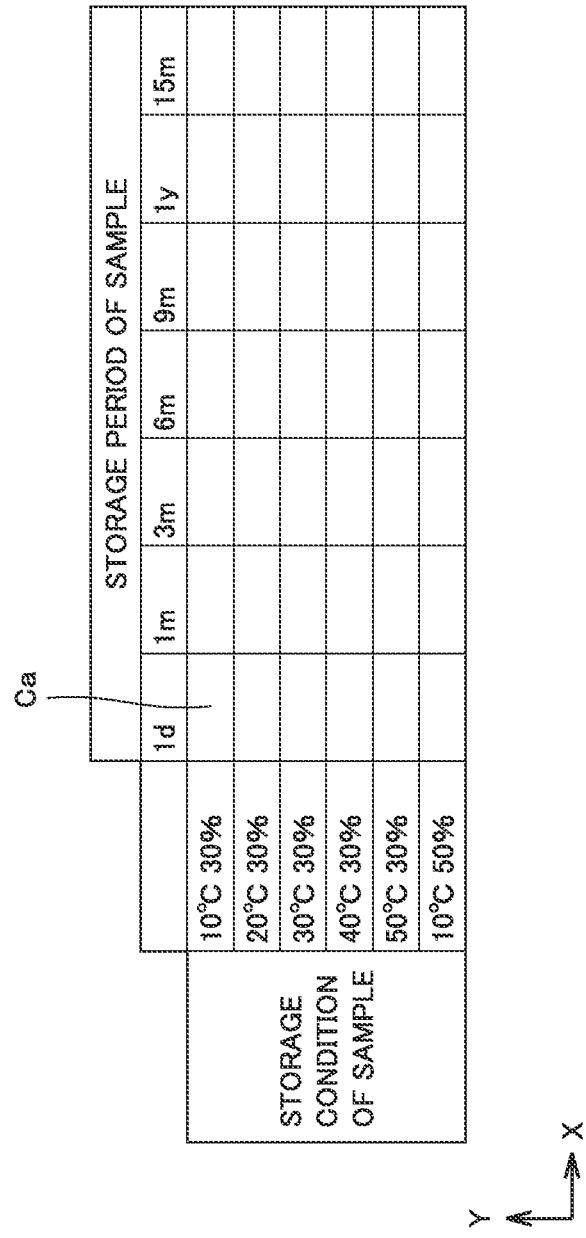
FIG. 3 is one example of a screen displayed by the display device.

FIG. 3 is one example of a screen displayed by display device 200. The screen of FIG. 3 is a screen displayed in a state where no test items are set for the samples. Display device 200 displays a screen in a matrix format. Hereinafter, the "matrix-format screen" is also referred to as a "matrix screen". The matrix screen includes a plurality of cells Ca. In the matrix screen of FIG. 3, a horizontal direction as viewed from the user is defined as an X-axis direction, and a vertical direction as viewed from the user is defined as a Y-axis direction. The X-axis direction corresponds to a "first direction" in the present disclosure, and the Y-axis direction corresponds to a "second direction" in the present disclosure.

In the present embodiment, a storage condition and a storage period are differentiated for objects to be tested (e.g., pharmaceutical products), by which the objects are regarded as different samples. That is, for each of the plurality of samples, the storage condition of the sample and the storage period of the sample are determined. As described above, in the present embodiment, the samples are distinguished on the basis of one storage condition and one storage period. Each of the samples is stored under the storage condition of the sample for the storage period after the test items are set for the sample, and then the test on the test items is performed. In the example of FIG. 3, one or more storage conditions of the sample are shown in the X-axis direction. One or more storage periods of the sample are shown in the Y-axis direction. In the storage period in FIG. 3, "d" indicates "day", "m" indicates "month", and "y" indicates "year".

In the example of FIG. 3, six storage conditions are illustrated as the one or more storage conditions. The six storage conditions are "temperature of 10° C. and humidity of 30%", "temperature of 20° C. and humidity of 30%", "temperature of 30° C. and humidity of 30%", "temperature of 40° C. and humidity of 30%", "temperature of 50° C. and humidity of 30%", and "temperature of 10° C. and humidity of 50%". Note that the storage conditions may be other conditions.

In the example of FIG. 3, seven storage periods are shown as the one or more storage periods. The seven storage periods are "1 day", "1 month", "3 months", "6 months", "9 months", "1 year", and "15 months". Note that the storage periods may be other periods.

Display device 200 displays an image corresponding to one sample. In the example of FIG. 3, an image corresponding to one sample is one cell Ca. In the example of FIG. 3, since the six storage conditions and the seven storage periods are defined, 42 (=6×7) cells Ca are displayed. The 42 samples correspond to 42 cells Ca.

For example, in the example of FIG. 3, a cell indicated as "Ca" is a cell corresponding to a "sample stored for 1 day under the storage condition of temperature of 10° C. and humidity of 30%". Therefore, the sample corresponding to this cell is stored under the storage condition of the temperature of 10° C. and the humidity of 30% for one day after the test items are set for the sample, and then the test on the test items is performed.

Display device 200 can accept selection of a cell from the user. The user can select a cell using input device 350 (see FIG. 2) such as a mouse. The user can set the test items for the sample corresponding to the selected cell.

FIG. 4 is one example of a setting screen displayed on display device 200 when display device 200 accepts the selection from the user for the cell. The user inputs the test items for the sample on the setting screen. FIG. 4 illustrates an example of a case where the user selects the cell corresponding to the sample whose storage condition is "temperature of 10° C. and humidity of 30%" and whose storage period is "1 day". Display device 200 may display an image of FIG. 4 as a pop-up image while displaying the matrix screen. In addition, display device 200 may display the image of FIG. 4 by switching the image of FIG. 4 from the matrix screen.

In the example of FIG. 4, characters "storage condition, storage period" are displayed on a left side of an upper stage. Characters "10° C., 30%, 1 d" are displayed as "storage condition, storage period" on a right side of the upper stage. Characters "test item" are displayed on a left side of a lower stage. When a test item is set for the sample corresponding to the cell selected by the user, characters of the set test item are displayed on a right side of the lower stage. In the example of FIG. 4, since the test item is not set for the sample corresponding to the cell selected by the user, the characters of the test item are not displayed on the right side of the lower stage and are blank.

When a blank area at the lower right of the lower stage of FIG. 4 is selected by the user, the user can set the test item. For example, when the blank area is selected by the user, a plurality of test item candidates are displayed in a pull-down format (not illustrated). The user selects the plurality of displayed test items, and display device 200 sets the selected test items.

FIG. 5 is a diagram illustrating one example of a screen in a case where the test items are set by the user on the screen of FIG. 4. In the example of FIG. 5, a case where Test A, Test B, Test C, Test D, and Test F are set as the test items is illustrated. The test items are distinguished by, for example, whether or not testing device 500 is used, a type of testing device 500 to be used, a type of a reagent to be used, and the like. Test A is, for example, a test using a liquid chromatograph device using a reagent X. Test B is, for example, a test in which a reagent Y is made to react with the sample without using the testing device to visually recognize a color of a reactant.

In addition, when the user selects a plurality of cells and sets the test items, display device 200 may collectively set the test items for the samples corresponding to the plurality of cells.

For example, a display device that displays all the cells in a same color regardless of the setting contents of the test items for the samples can be considered. However, the above-described display device may cause a problem that it is difficult for the user to confirm the setting content of the test items. Therefore, display device 200 of the present embodiment displays the cell corresponding to each of the plurality of samples in a color corresponding to the setting content of the test items for the sample. Therefore, it is easy for the user to confirm the setting content of the test items for the sample.

Figure 6:
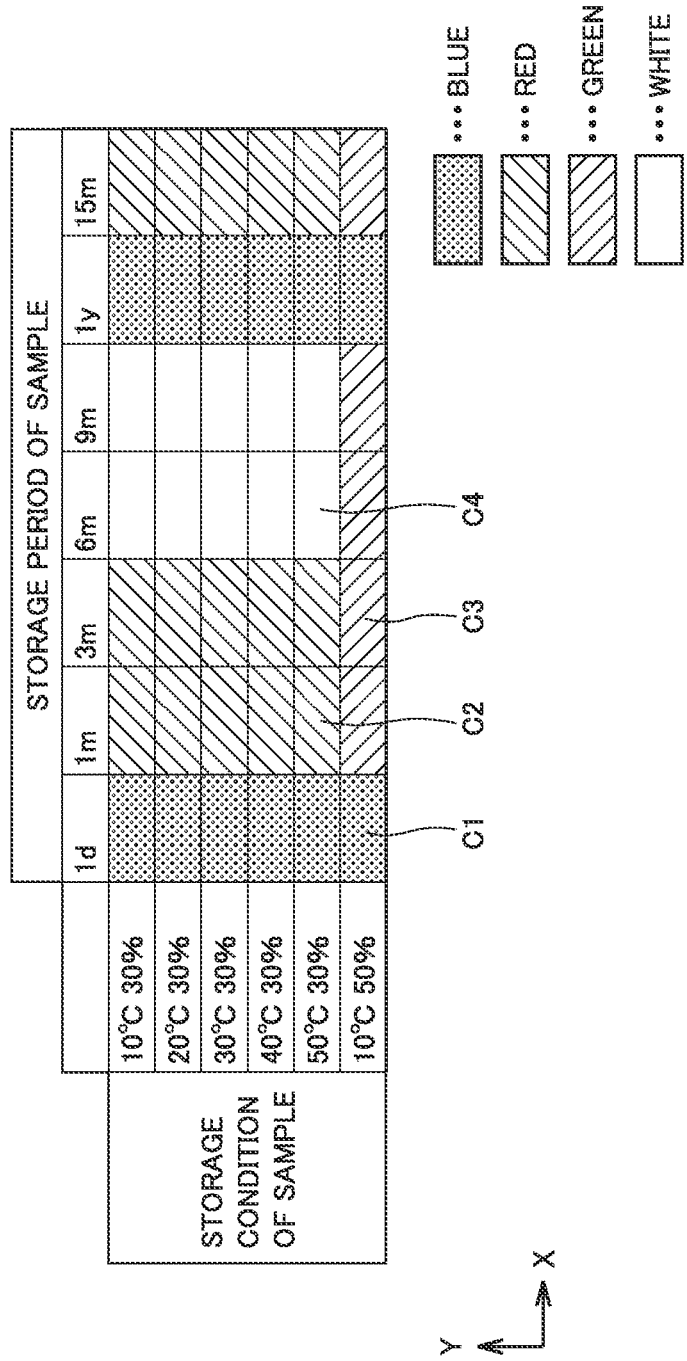
FIG. 6 is one example of a screen displayed by the display device.

FIG. 6 is a diagram illustrating one example of a matrix screen in a case where the test items are set. In FIG. 6, dotted cells C1 are actually displayed in blue. Cells C2 hatched with right-upward oblique lines are actually displayed in red. Cells C3 hatched with right-downward oblique lines are actually displayed in green. Unpatterned cells C4 are actually displayed in white. Note that the colors illustrated in FIG. 6 are merely examples, and other colors may be used. In addition, a cell corresponding to a sample for which the test items different from the test items set for each of the samples corresponding to cells C1, the samples corresponding to cells C2, and the samples corresponding to cells C3 are set is displayed in a color other than blue, red, and green.

Display device 200 displays a cell corresponding to each of two or more samples having the same setting content of the test items in the same color. Therefore, the user can recognize whether or not the setting contents of the test items are the same for the two or more samples by visually recognizing the color of the cell.

The fact that the setting contents of the test items are the same includes that when the number of test items set in each of two or more samples is one, one test item for each of the two or more samples is the same. In addition, the fact that the setting contents of the test items are the same includes that when the number of test items set for each of two or more samples is plural, a combination of the plurality of test items for each of the two or more samples is the same.

In the example of FIG. 6, display device 200 displays, in blue, the plurality of cells C1 corresponding to the plurality of samples for which the same test items are set. In addition, display device 200 displays, in red, the plurality of cells C2 corresponding to the plurality of samples for which the same test items are set. These test items are different from the test items set in the samples corresponding to cells C1. In addition, display device 200 displays, in green, the plurality of cells C3 corresponding to the plurality of samples for which the same test items are set. These test items are different from the test items set in the samples corresponding to cells C1 and the test items set in the samples corresponding to cells C2. In addition, display device 200 displays, in white, the plurality of cells C4 corresponding to the plurality of samples for which no test items are set.

Display device 200 displays, in the different colors, the cells corresponding to the two or more samples having the different setting contents of the test items. Therefore, the user can recognize whether or not the setting contents of the test items are different for two or more samples by visually recognizing the colors of the cells.

The fact that the setting contents of the test items are different includes that when the number of test items set for each of two or more samples is one, one test item for each of the two or more samples is different. In addition, the fact that the setting contents of the test items are different includes that when the number of test items set for each of two or more samples is plural, a combination of the plurality of test items for each of the two or more samples is different.

In the example of FIG. 6, the test items set for the samples corresponding to cells C1 displayed in blue, the test items set for the samples corresponding to cells C2 displayed in red, and the test items set for the samples corresponding to cells C3 displayed in green are different from one another.

In addition, display device 200 displays, in different colors, the cells corresponding to the samples for which the test items are set and the cells corresponding to the samples for which no test items are set. Therefore, the user can recognize whether or not the test items are set for the sample by visually recognizing the colors of the cells.

In the example of FIG. 6, display device 200 displays, in colors (in the example of FIG. 6, red, blue, and green are used), the cells corresponding to the samples for which the test items are set. In addition, display device 200 displays, in white, the cells corresponding to the samples for which no test items are set.

As illustrated in FIG. 6, display device 200 displays the cell corresponding to each of the plurality of samples in a display manner according to the setting content of the test items for the sample. Therefore, the user does not need to select the cell corresponding to the sample for the setting content of the test items. Therefore, display device 200 makes it easy for the user to confirm the setting content of the test items for the sample. In addition, the user does not need to execute an "operation of displaying the test items for the sample on display unit 206 in a display manner according to the setting content of the test items". Therefore, a burden on the user can be reduced. In addition, as illustrated in FIG. 6, display device 200 displays the image in the color corresponding to the setting content of the test items. Therefore, the user can visually recognize the setting content of the test items based on the color of the cell.

As illustrated in FIG. 6, display device 200 does not display the test items in a state where no cell is selected by the user. Therefore, display device 200 can prevent a large amount of information from being displayed in the state where no cell is selected by the user. When a cell is selected by the user, display device 200 displays the test items set in the sample corresponding to the selected cell. Therefore, since the test items set for the sample corresponding to the cell selected by the user are displayed on display unit 206, the user can recognize the test items set for the sample corresponding to the cell selected by the user himself/ herself.

For example, when the user selects the cell corresponding to the sample of the "storage condition of temperature of 10° C. and humidity of 30%" and the "storage period of one day", display device 200 displays an image illustrated in FIG. 5. Display device 200 may display the image of FIG. 5 as a pop-up image while displaying the matrix screen. In addition, display device 200 may display the image of FIG. 5 by switching the image from the matrix screen.

Note that the color of the cell of the present embodiment is information indicating whether or not the test item is set for the sample corresponding to the cell, and whether a sample exists for which the same test items as those of the sample corresponding to the cell are set. As in the present embodiment, the color of the cell may not indicate the type of the test items set for the sample corresponding to the cell. When the user wants to confirm the test items set in the sample, the user selects the cell corresponding to the sample to display the image illustrated in FIG. 5 on display device 200.

In the matrix screen illustrated in FIG. 6 or the like, when the user ends the setting of the test items, the user executes a predetermined end operation. The predetermined end operation is, for example, an operation on an end button (not illustrated). The end button is displayed by display device 200.

[Exemplary Functional Configuration of Display Device]

Figure 7:
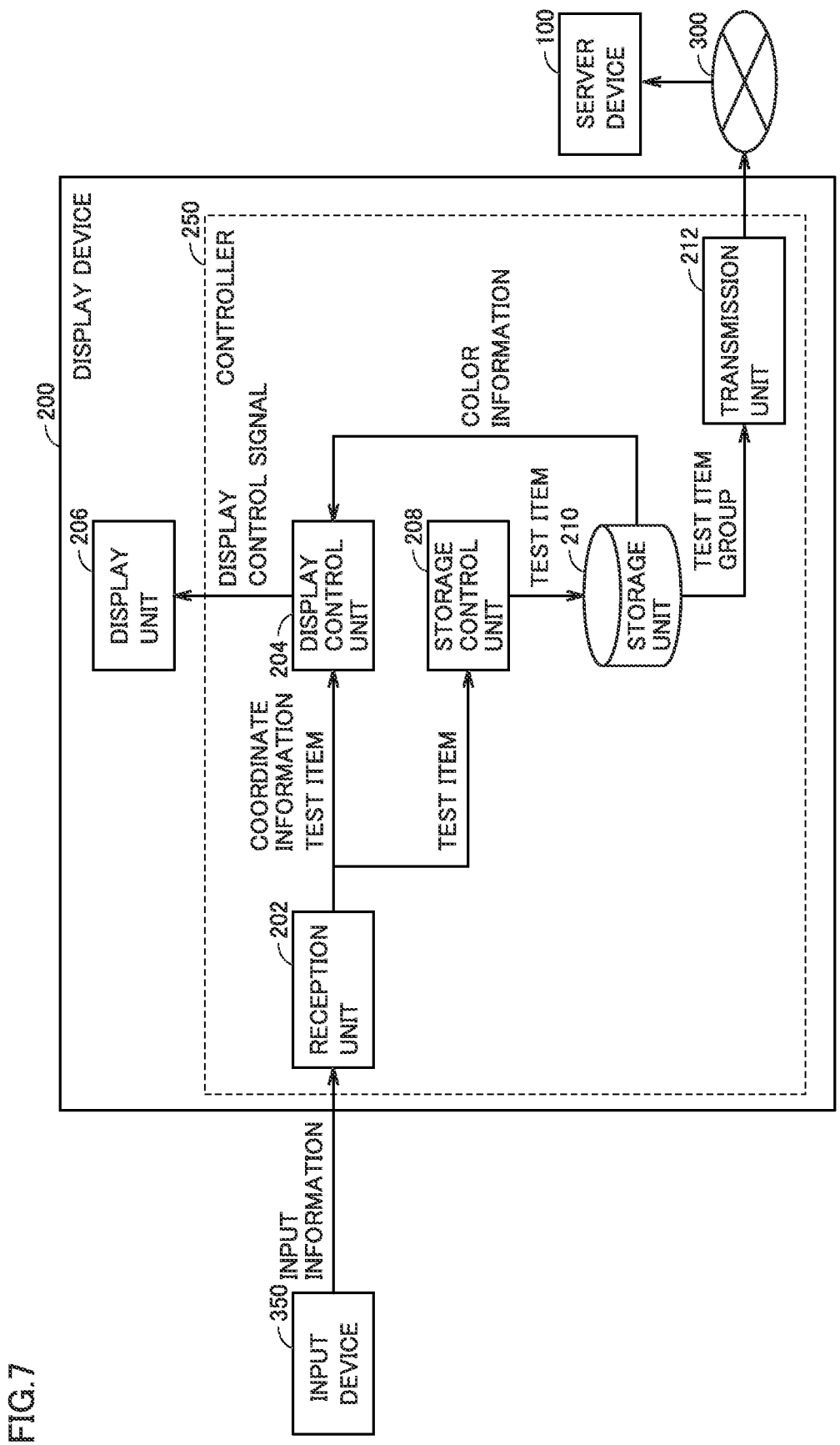

FIG. 7 is a functional block diagram of display device 200 and the like. As described with reference to FIG. 2, display device 200 has display unit 206 and controller 250. Controller 250 includes a reception unit 202, a display control unit 204, a storage control unit 208, a storage unit 210, and a transmission unit 212.

When the user operates input device 350, input information is input from input device 350 to controller 250. Here, the input information includes coordinate information of the cell selected by the user, the test items set by the user, and the like. Reception unit 202 receives the input information. Reception unit 202 transmits the test items included in the input information to storage control unit 208. When receiving the test items from reception unit 202, storage control unit 208 stores the test items in storage unit 210 for each of the samples Storage control unit 208 stores the sample and the test items in storage unit 210 in association with each other.

FIG. 8 illustrates one example of the test items stored in storage unit 210. As illustrated in FIG. 8, the test item are set for each of the samples (i.e., on the basis of the storage condition and the storage period of the sample). In the example of FIG. 8, Test A, Test B, Test C, Test D, and Test E are set for the sample whose storage condition is "temperature of 10° C. and humidity of 30%" and whose storage period is "1 day". In addition, Test A, Test B, Test C, and Test E are set for the sample whose storage condition is "temperature of 20° C. and humidity of 30%" and whose storage period is "1 day".

When the above-described end operation is executed by the user, transmission unit 212 transmits all the set test items to server device 100 via network 300. Server device 100 manages (stores) the information such as the test items transmitted from one or more display devices 200.

In addition, reception unit 202 transmits the test items and the coordinate information to display control unit 204. Display control unit 204 specifies the cell selected by the user on the basis of the coordinate information. Display control unit 204 transmits a display control signal to display unit 206 to cause display unit 206 to display the specified cell in a color according to the test items from reception unit 202. Display control unit 204 determines the color of the cell on the basis of a color data base (DB).

FIG. 9 is a diagram illustrating one example of the color DB used to determine the color of the cell. The color DB is stored in storage unit 210. In FIG. 9, the color of the cell is associated with each color parameter. FIG. 9 will be described later with reference to FIG. 10.

[Flowchart of Controller]

Figure 10:
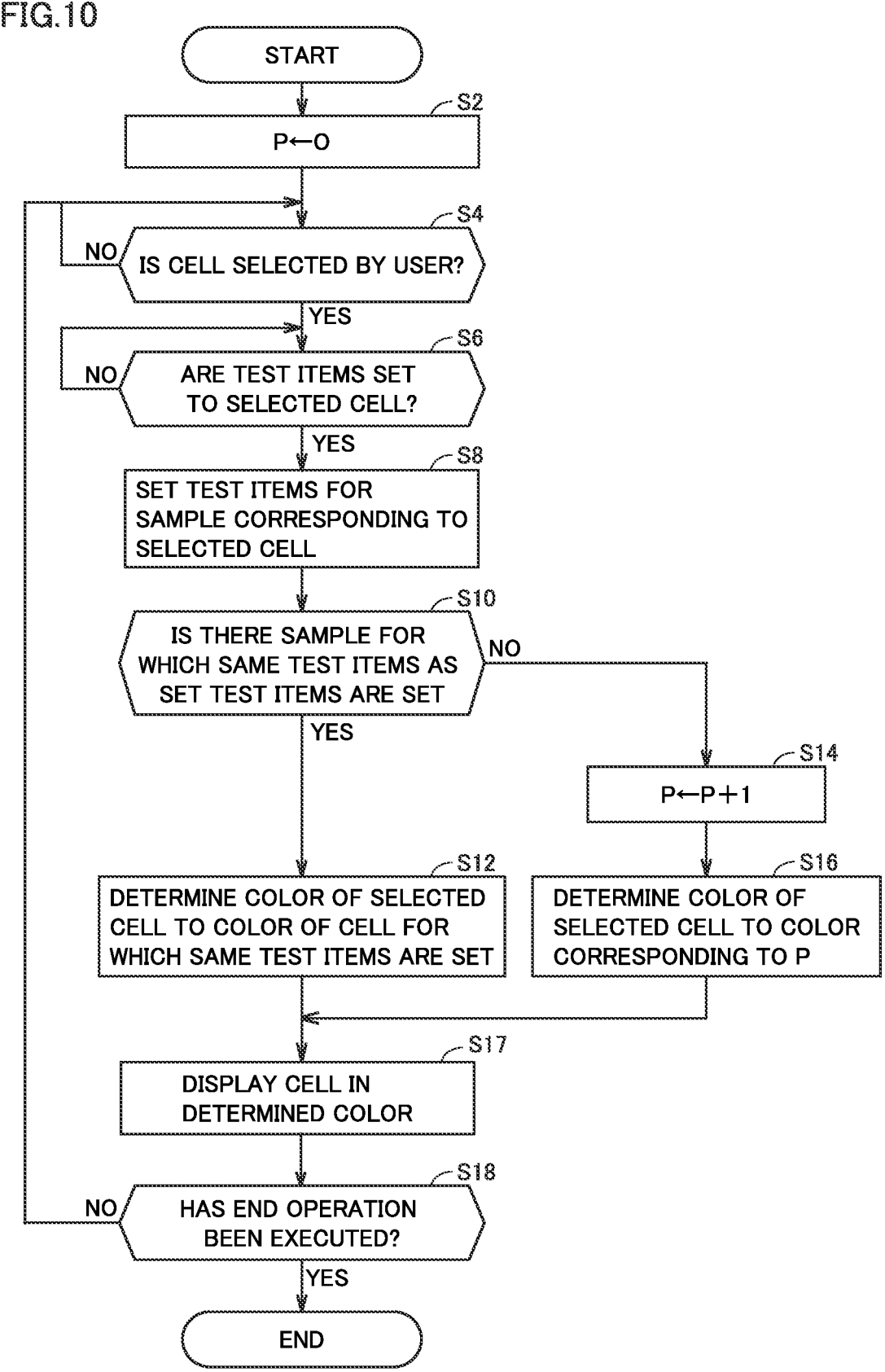
FIG. 10 is one example of a flowchart of the display device.

FIG. 10 is one example of a flowchart of controller 250 of display device 200. In the flowchart of FIG. 10, controller 250 starts processing of FIG. 10 when the user executes a start operation of setting the test items for the sample.

First, in step S2, controller 250 initializes a color parameter P (see FIG. 9). In the present embodiment, an initial value of color parameter P is assumed to be "0". Color parameter P is a parameter for determining the color of the cell. Next, in step S4, controller 250 determines whether or not selection by the user for the cell has been accepted. Controller 250 repeats the processing in step S4 until the selection of the user is accepted (NO in step S4). In step S4, if controller 250 determines that the user has selected a cell (YES in step S4), the processing proceeds to step S6.

In step S6, controller 250 determines whether the setting of the test items by the user for the sample corresponding to the selected cell has been accepted (see FIG. 5). In step S6, controller 250 repeats the processing in step S6 until the test items are set by the user (NO in step S6). In step S6, if controller 250 determines that the test items have been set by the user (YES in step S6), the processing proceeds to step S8.

In step S8, storage control unit 208 of controller 250 sets the test items for the sample corresponding to the selected cell. In the present embodiment, as illustrated in the test items of FIG. 8, storage control unit 208 stores the test items for the sample.

Next, in step S10, controller 250 determines whether or not a sample exists for which the same test items as the set test items are set on the basis of the set test items in FIG. 8. In step S10, if the same test items have already been set by the user (YES in step S10), the processing proceeds to step S12.

In step S12, controller 250 determines the color of the cell selected by the user in step S4 to be the same color as the cell corresponding to the sample for which the same test items are set. Next, in step S17, display control unit 204 of controller 250 displays the cell in the color determined in step S12. Next, in step S18, controller 250 determines whether or not an end operation has been executed. In step S18, if controller 250 determines that the end operation has not been executed (NO in step S18), the processing returns to step S4. On the other hand, in step S18, if controller 250 determines that the end operation has been executed (YES in step S18), display device 200 transmits, to server device 100, all the set test items and information for identifying all the samples for which the test items have been set and then the processing of FIG. 10 ends.

On the other hand, in step S10, when controller 250 determines that the sample does not exist for which the same test items as the set test items are set (NO in step S10), the processing proceeds to step S14. In step S14, controller 250 increments color parameter P by one. Next, in step S16, display control unit 204 determines a color corresponding to color parameter P with reference to color DB of FIG. 9. Next, in step S17, display control unit 204 displays, in the determined color, the cell selected by the user in step S4.

As shown in steps S10, S12, S14, and S16, controller 250 determines the color of the cell selected by the user in accordance with the setting content of the test items for the sample corresponding to the cell. Therefore, when the same test items are set for two or more samples, display device 200 can display the cells corresponding to the two or more samples in the same color, and when the different test items are set for two or more samples, the display device can display the cells corresponding to the two or more samples in different colors.

Other Embodiments (1) In the above-described embodiment, the configuration in which display device 200 displays the cell in the color corresponding to the test content of the test items has been described as illustrated in FIG. 6. However, display device 200 may display additional information on the cell. For example, display device 200 may display sample information on the sample corresponding to each of the cells in association with the cell.

Figure 11:
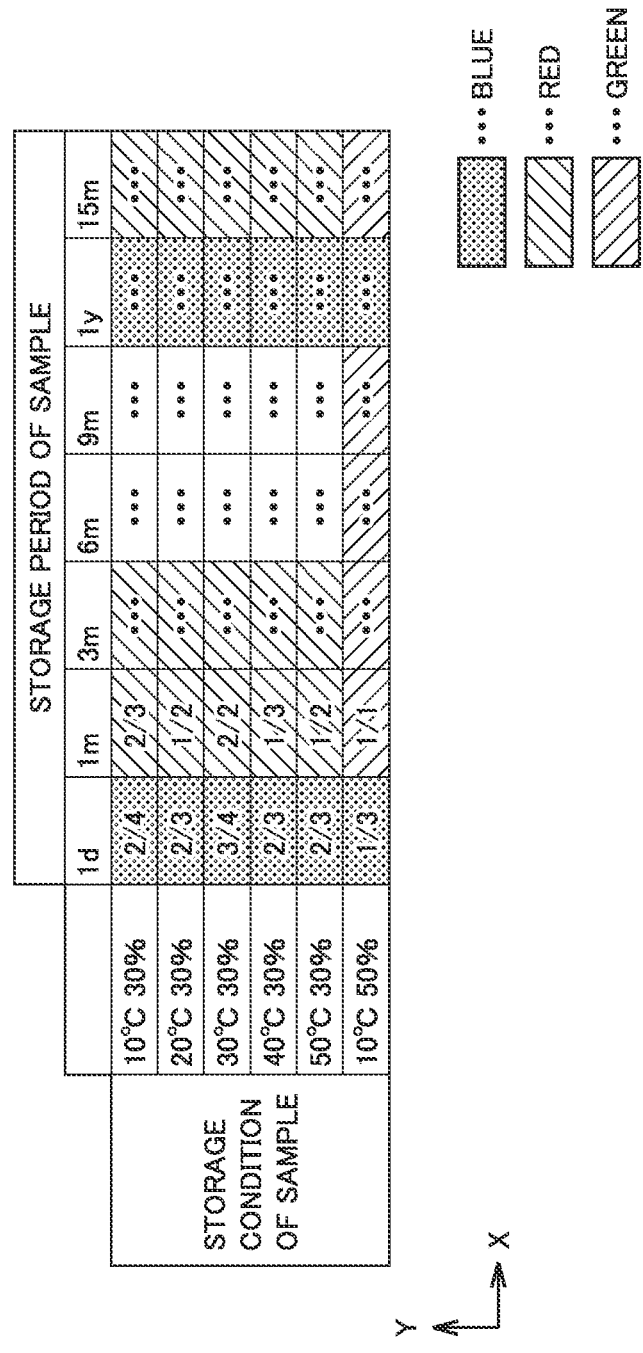
FIG. 11 is one example of a screen displayed by the display device of another embodiment.

FIG. 11 is one example of a screen displayed by display unit 206 of the present embodiment. In the example of FIG. 11, the sample information is displayed in the cell. In the example of FIG. 11, the sample information is information including a total number of samples corresponding to the cell for which the sample information is displayed and a number of samples to be tested.

In the example of FIG. 11, the number of samples to be tested and the total number of existing samples are displayed in a fraction form. A numerator in this fraction indicates the number of samples to be tested and a denominator indicates the total number of existing samples. In addition, a value obtained by subtracting the numerator from the denominator indicates a number of preliminary samples. The preliminary samples are preliminarily used, for example, when a test performed on the sample fails.

For example, "2/3" is displayed in the cell corresponding to the sample whose storage condition is "temperature of 20° C. and humidity of 30%" and whose storage period is "1 day". The total number of samples corresponding to the cell labeled "2/3" indicates 3, the number of samples to be tested indicates 2, and the number of preliminary samples is one. Note that, in the above-described embodiment, the configuration in which one cell corresponds to one sample has been described. In the present embodiment, one cell corresponds to one or more samples.

In addition, regardless of the displayed sample information, controller 250 displays the cell associated with the sample information on display unit 206 in a color corresponding to the setting content of the test items. As illustrated in FIG. 11, regardless of the number of samples to be tested and the total number of samples, the cell corresponding to the sample is displayed on display unit 206 in a color according to the setting content of the test items for the sample.

As described above, the user can recognize the sample information (in the example of FIG. 11, the number of samples to be tested and the total number of samples) related to the sample corresponding to the cell. In addition to the sample information, the user can also recognize the setting content of the test items for the sample corresponding to the cell.

Further, the sample information may be other information. For example, the sample information may be information indicating only the number of samples to be tested without including the information indicating the total number of existing samples. In addition, the sample information may be, for example, a name of the sample.

In addition, the sample information may be displayed in another display manner as long as the sample information is displayed in association with the cell without being displayed in the cell. For example, display device 200 may display the cell and the sample information corresponding to the cell by connecting the cell and the sample information with a line.

(2) In the above-described embodiment, the configuration has been described in which controller 250 displays the cell corresponding to each of the plurality of samples on display unit 206 in the color corresponding to the setting content of the test items for the sample. However, the display manner according to the setting content of the test items for the sample may be another display manner. The other display manner may be, for example, any of a display manner with symbols and a display manner with patterns. In the example of FIG. 6, display unit 206 may display a symbol "A" in the cell instead of displaying the cell in blue. Display unit 206 may display a symbol "B" in the cell instead of displaying the cell in red. Display unit 206 may display a symbol "C" in the cell instead of displaying the cell in green. Display unit 206 may display a symbol "D" in the cell instead of displaying the cell in white.

(3) In the above-described embodiment, the configuration in which the image corresponding to the sample is the cell has been described. However, the image corresponding to the sample may be another image. The other image may be, for example, an icon image indicating a type of sample or the like.

(4) In the above-described embodiment, as described in step S10 of FIG. 10, the configuration has been described in which controller 250 determines the color on the basis of whether or not a sample exists for which the same test items as the set test items are set. However, storage unit 210 may hold a table in which combinations of the test items, and colors are associated on a one-to-one basis, and display control unit 204 may display the cells in the colors corresponding to the set test items. With such a configuration, the user can recognize the combination of the set test items from the color of the cell.

(5) In the above-described embodiment, the configuration has been described in which display device 200 does not display the test items in a state where the cell is not selected by the user. However, when the number of set test items is less than or equal to a predetermined number, display device 200 may display the test items in the cell in the state where the cell is not selected by the user. For example, when the predetermined number is "three", display device 200 displays the set test items in the cell corresponding to the sample for which the number of set test items is less than or equal to three. On the other hand, display device 200 does not display the set test items in the cell corresponding to the sample for which the number of set test items is greater than or equal to four, and displays the set test items when the cell is selected by the user. According to such a configuration, it is possible to reduce an amount of displayed information on the matrix screen in the state where the cell is selected by the user.

[Aspects]

It is understood by those skilled in the art that the plurality of exemplary embodiments described above are specific examples of the following aspects.

(Clause 1) A display device according to one aspect is a display device used in a management system that manages a test item for each of a plurality of samples, the display device including: a display unit, and a control unit that controls the display unit, wherein the control unit displays an image corresponding to each of the plurality of samples on the display unit in a display manner according to a setting content of the test item for the sample.

According to the display device described in clause 1, it is possible to facilitate confirmation of the setting content of the test item for the sample by the user.

(Clause 2) In the display device according to clause 1, the control unit displays an image on the display unit in a color according to the setting content of the test item.

According to the display device described in clause 2, since the image is displayed on the display unit in the color corresponding to the setting content of the test item, the user can visually recognize the setting content of the test item on the basis of the color of the image.

(Clause 3) In the display device according to clause 1 or clause 2, the control unit displays images in a same display manner on the display unit, the images corresponding respectively to two or more samples having the same setting content of the test item.

According to the display device described in clause 3, since the image is displayed on the display unit in the color corresponding to the setting content of the test item, the user can visually recognize the setting content of the test item on the basis of the color of the image.

(Clause 4) In the display device according to any one of clauses 1 to 3, the control unit displays images in different display manners on the display unit, the images corresponding to two or more samples having different setting contents of the test item.

According to the display device described in clause 4, the user can recognize whether or not the different test items are set for the two or more samples by visually recognizing the display manner of the image.

(Clause 5) In the display device according to any one of clauses 1 to 4, the control unit displays, in different display manners on the display unit, an image corresponding to a sample for which the test item is set and an image corresponding to a sample for which the test item is not set.

According to the display device described in clause 5, the user can recognize whether or not the test item is set for the sample by visually confirming the display manner of the image.

(Clause 6) In the display device according to any one of clauses 1 to 5, when a user selects the image, the control unit displays, on the display unit, the test item set for the sample corresponding to the image.

According to the display device described in clause 6, since the test item set for the sample corresponding to the image selected by the user is displayed on the display unit, the user can recognize the test item set for the sample corresponding to the image designated by the user.

(Clause 7) In the display device according to any one of clauses 1 to 6, the control unit displays, on the display unit in association with the image, sample information on the sample corresponding to the image, and, regardless of the displayed sample information, displays the image associated with the sample information on the display unit in a display manner according to the setting content of the test item.

According to the display device described in clause 7, the user can recognize sample information on the sample corresponding to the image. In addition to the sample information, the user can also recognize the setting content of the test item for the sample corresponding to the image.

(Clause 8) In the display device according to any one of clauses 1 to 7, when a user selects the image and sets the test item for the sample corresponding to the image, the control unit determines whether or not a sample exists for which the same test item as the set test item is set; when it is determined that the sample exists for which the same test item as the set test item is set, the control unit displays the image selected by the user in a same display manner as the image corresponding to the sample for which the same test item is set; and when it is determined that no sample exists for which the same test item as the set test item is set, the control unit determines the display manner of the image selected by the user to be a display manner different from the display manner of the image being displayed, and displays the image selected by the user in the determined display manner.

According to the display device described in clause 8, when the same test item is set for the two or more samples, the images corresponding to the two or more samples can be displayed in the same display manner, and when the different test items are set for the two or more samples, the images corresponding to the two or more samples can be displayed in the different display manners.

(Clause 9) In the display device according to any one of clauses 1 to 8, the control unit displays the image corresponding to each of the plurality of samples as a plurality of cells in a matrix format.

According to the display device described in clause 9, it is possible to cause the user to recognize the image corresponding to each of the plurality of samples in the matrix format.

(Clause 10) In the display device according to clause 9, a storage condition of the sample and a storage period of the sample are determined for each of the plurality of samples, and the storage condition is indicated in a first direction of the matrix format, and the storage period is indicated in a second direction orthogonal to the first direction of the matrix format.

According to the display device described in clause 10, it is possible to cause the user to recognize the storage condition of the sample and the storage period of the sample in the matrix format.

(Clause 11) A management system includes: the display device according to any one of clauses 1 to 10; and a server device that stores the test item set by a user for the display device.

According to the management system of clause 11, it is possible to manage the test item set by the user for the display device.

(Clause 12) A control method according to one aspect is a control method for controlling a display device used in a management system that manages a test item for each of a plurality of samples, the control method including: accepting selection of an image corresponding to each of the plurality of samples by a user; accepting setting of the test item made by the user for a sample corresponding to the image selected by the user; determining a display manner of the image selected by the user in accordance with a setting content of the test item for the sample corresponding to the image; and displaying the image in the determined display manner.

According to the display device described in clause 12, it is possible to facilitate confirmation of the setting content of the test item for the sample by the user.

(Clause 13) A program according to one aspect causes a display device, which is used in a management system that manages a test item for each of a plurality of samples, to execute: accepting selection of an image corresponding to each of the plurality of samples by a user; accepting setting of the test item made by the user for a sample corresponding to the image selected by the user; determining a display manner of the image selected by the user in accordance with a setting content of the test item for the sample corresponding to the image; and displaying the image in a determined display manner.

According to the program described in clause 13, it is possible to facilitate confirmation of the setting content of the test item for the sample by the user.

The embodiments disclosed herein are also planned to be appropriately combined and implemented within a range not technically contradictory. It should be considered that the embodiments disclosed this time are examples in all respects and are not restrictive. The scope of the present embodiments is defined not by the above-described embodiments but by the claims, and it is intended that all modifications within meaning and scope equivalent to the claims are included.

REFERENCE SIGNS LIST

100: server device, 200: display device, 202: reception unit, 204: display control unit, 206: display unit, 208: storage control unit, 210: storage unit, 212: transmission unit, 250: controller, 300: network, 350: input device, 362: ROM, 364: RAM, 500: testing device, 1000: management system

The invention claimed is:

1. A test item management system display device that manages a test item for each of a plurality of samples, the plurality of samples are generated by storing an object to be tested under different storage conditions, the test item management system display device comprising:
   a display unit; and
   a control unit that controls the display unit,
   wherein the control unit displays an image corresponding to each of the plurality of samples on the display unit in a display manner according to a setting content of the test item for the sample for each storage condition;
   the test item for each of the plurality of samples are distinguished by at least one of whether or not a testing device is used, the type of testing device to be used, or a type of a reagent to be used.

2. The test item management system display device according to claim 1, wherein the control unit displays the image on the display unit in a color according to the setting content of the test item.

3. The test item management system display device according to claim 1, wherein the control unit displays images in a same display manner on the display unit, the images corresponding respectively to two or more samples having the same setting content of the test item.

4. The test item management system display device according to claim 1, wherein the control unit displays images in different display manners on the display unit, the images corresponding to two or more samples having different setting contents of the test item.

5. The test item management system display device according to claim 1, wherein the control unit displays, in different display manners on the display unit, an image corresponding to a sample for which the test item is set and an image corresponding to a sample for which the test item is not set.

6. The test item management system display device according to claim 1, wherein, when a user selects the image, the control unit displays, on the display unit, the test item set for the sample corresponding to the image.

7. The test item management system display device according to claim 1, wherein
   the control unit displays, on the display unit in association with the image, sample information on samples corresponding to the image, and
   the sample information includes a total number of samples corresponding to the image, and a number of samples to be tested.

8. The test item management system display device according to claim 1, wherein
   when a user selects the image and sets the test item for the sample corresponding to the image, the control unit determines whether or not a sample exists for which the same test item as the set test item is set,
   when it is determined that the sample exists for which the same test item as the set test item is set, the control unit displays the image selected by the user in a same display manner as the image corresponding to the sample for which the same test item is set, and when it is determined that no sample exists for which the same test item as the set test item is set, the control unit determines the display manner of the image selected by the user to be a display manner different from the display manner of the image being displayed, and displays the image selected by the user in the determined display manner.

9. The test item management system display device according to claim 1, wherein the control unit displays the image corresponding to each of the plurality of samples as a plurality of cells in a matrix format.

10. The test item management system display device according to claim 9, wherein a storage condition of the sample and a storage period of the sample are determined for each of the plurality of samples, and the storage condition is indicated in a first direction of the matrix format, and the storage period is indicated in a second direction orthogonal to the first direction of the matrix format.

11. A management system comprising:

the test item management system display device according to claim 1; and a server device that stores the test item set by a user for the test item management system display device.

12. A control method for controlling a display device used in a management system that manages a test item for each of a plurality of samples, the plurality of samples are generated by storing an object to be tested under different storage conditions, the control method comprising:

accepting selection of an image corresponding to each of the plurality of samples by a user;

accepting setting of the test item made by the user for a sample corresponding to the image selected by the user;

determining a display manner of the image selected by the user in accordance with a setting content of the test item for the sample corresponding to the image; and displaying the image in the determined display manner for each storage condition;

the test item for each of the plurality of samples are distinguished by at least one of whether or not a testing device is used, the type of testing device to be used, or a type of a reagent to be used.

13. A computer readable storage medium that stores a program for causing a display device, which is used in a management system that manages a test item for each of a plurality of samples, the plurality of samples are generated by storing an object to be tested under different storage conditions, to execute:

accepting selection of an image corresponding to each of the plurality of samples by a user;

accepting setting of the test item made by the user for a sample corresponding to the image selected by the user;

determining a display manner of the image selected by the user in accordance with a setting content of the test item for the sample corresponding to the image; and displaying the image in the determined display manner for each storage condition;

the test item for each of the plurality of samples are distinguished by at least one whether or not a testing device is used, the type of testing device to be used, or a type of a reagent to be used.

14. The test item management system display device according to claim 1, wherein the control unit displays, in a state where an image is selected by a user, a test item that is set for a sample corresponding to the image, and does not display, in a state where an image is not selected by a user, a test item that is set for a sample corresponding to the image.

* * * * *